(12) United States Patent
DeWald

(10) Patent No.: US 6,936,179 B2
(45) Date of Patent: Aug. 30, 2005

(54) METHOD AND APPARATUS FOR ADDING OXYGEN TO DRINKING WATER

(76) Inventor: Jack J. DeWald, 7323 W. Roadway, New Orleans, LA (US) 70124

( * ) Notice: Subject to any disclaimer, the term of this patent is extended or adjusted under 35 U.S.C. 154(b) by 0 days.

(21) Appl. No.: 10/414,362

(22) Filed: Apr. 15, 2003

(65) Prior Publication Data

US 2004/0206708 A1 Oct. 21, 2004

(51) Int. Cl.$^7$ .................................................. C02F 1/78
(52) U.S. Cl. ........................... 210/760; 210/95; 210/137; 210/192; 210/205; 210/533
(58) Field of Search ................................. 210/760, 800, 210/95, 97, 137, 198.1, 205, 192, 532.1, 533, 534; 261/DIG. 42, DIG. 75

(56) References Cited

U.S. PATENT DOCUMENTS

| | | |
|---|---|---|
| 1,413,898 A | 4/1922 | Caps |
| 1,945,435 A | 1/1934 | Hopkins |
| 4,412,924 A | 11/1983 | Feather |
| 4,652,382 A * | 3/1987 | Edwards et al. ............ 210/752 |
| 4,902,411 A | 2/1990 | Lin |
| 5,266,216 A | 11/1993 | Agueda et al. |
| 5,431,861 A * | 7/1995 | Nagahiro et al. ......... 261/140.1 |
| 5,587,089 A * | 12/1996 | Vogel et al. ................. 210/764 |
| 5,637,231 A * | 6/1997 | Hill et al. .................... 210/748 |
| 5,709,799 A | 1/1998 | Engelhard |
| 5,803,139 A * | 9/1998 | Kennedy ..................... 141/231 |
| 5,971,368 A * | 10/1999 | Nelson et al. ............. 261/64.3 |
| 6,106,731 A * | 8/2000 | Hayes ......................... 210/760 |
| 6,132,609 A | 10/2000 | Chang et al. |
| 6,197,206 B1 * | 3/2001 | Wasinger .................... 210/760 |
| 6,352,387 B1 * | 3/2002 | Briggs et al. .......... 405/128.25 |
| 6,780,331 B2 * | 8/2004 | Galatro et al. .............. 210/747 |
| 6,821,438 B2 * | 11/2004 | Hadley et al. .............. 210/695 |
| 2003/0183584 A1 * | 10/2003 | Galatro et al. ............. 210/760 |
| 2003/0234225 A1 * | 12/2003 | Brunsell ...................... 210/760 |

* cited by examiner

Primary Examiner—Frank M. Lawrence
(74) Attorney, Agent, or Firm—David L. Ray

(57) ABSTRACT

A method and apparatus for producing super-oxygenated water for human consumption including forcing atmospheric air through a filter to remove impurities, exposing the filtered air to ultra violet light to cleanse the air, and to form ozone and oxygen in the air, forcing the filtered air, ozone, and oxygen into a stream of flowing water to dissolve said air, ozone, and oxygen in said water, and spraying the stream of water having air, ozone, and oxygen dissolved therein into a vessel under superatmospheric pressure.

16 Claims, 2 Drawing Sheets

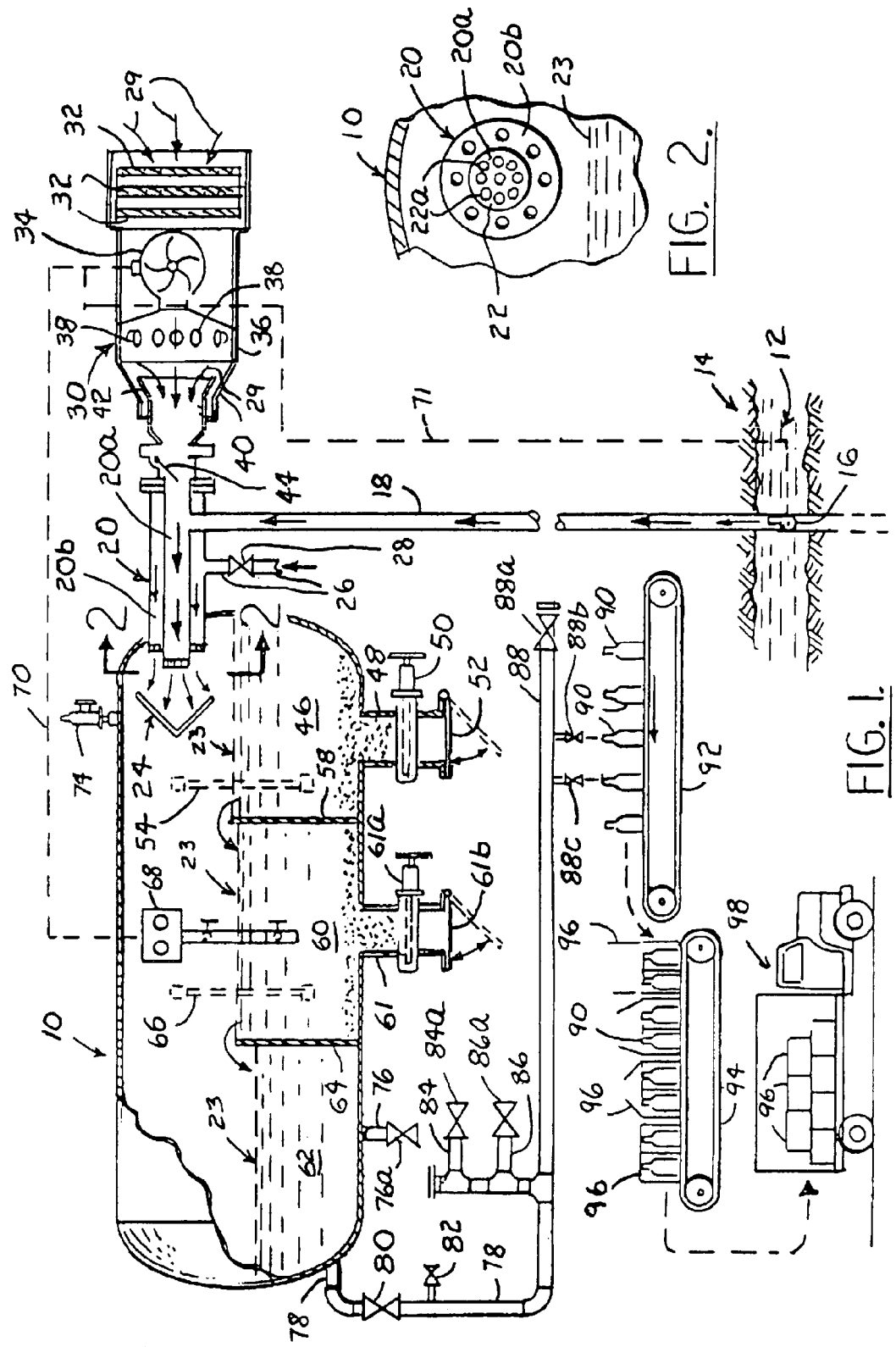

METHOD AND APPARATUS FOR ADDING OXYGEN TO DRINKING WATER

BACKGROUND OF THE INVENTION

1. Field of the Invention

The present invention relates to methods and apparatus for increasing the oxygen content of water. More particularly, the invention relates to methods and apparatus for increasing content of water for human consumption.

2. Description of the Related Art

Consumption of bottled water has been increasing for the past several years throughout the world. Bottled water, rather than tap water, is preferred by health conscious individuals for many reasons. Bottled water is generally believed to be of higher purity than tap water, although some bottled water is obtained from municipal tap water supplies. Some bottled water is available from naturally occurring springs which may contain desirable minerals. Other bottled water sources are filtered water and distilled water.

One of the principal factors contributing to the cost of bottled water is the cost of transportation of the bottled water to the consumer. To keep the cost of bottled water to a minimum, the bottling plant should be close to the source of the water and close to the consumer.

Oxygen enhanced bottled water, sometimes referred to as super oxygenated water, is known in the art. Recent claims for increased health benefits for athletes and others consuming oxygen enhanced water has increased demand for oxygen enhanced water.

Exemplary of the related art are the following U.S. Pat. Nos. 1,413,898; 1,945,435; 4,412,924; 4,902,411; 5,266,216; 5,709,799 and 6,132,609.

BRIEF SUMMARY OF THE INVENTION

In accordance with the present invention there is provided a method and apparatus for producing super-oxygenated water for human consumption. The method includes providing super-oxygenated water for human consumption including forcing atmospheric air through a filter to remove impurities, exposing the filtered air to ultra violet light to cleanse the air, and to form ozone and oxygen in the air, forcing the filtered air, ozone, and oxygen into a stream of flowing water to dissolve said air, ozone, and oxygen in said water, and spraying the stream of water having air, ozone, and oxygen dissolved therein into a vessel under superatmospheric pressure.

The apparatus includes hollow blower chamber assembly having an air blower, a filter for filtering atmospheric air entering the air blower, an ultra violet light chamber for receiving the filtered air discharged from the air blower having ultra violet lights which shine on the air pumped from the air blower to form oxygen and ozone in the air and discharging the air, oxygen and ozone therefrom, a first cylindrical chamber for receiving a stream of flowing water and for receiving the air, oxygen, and ozone discharged from the ultra violet light chamber, mixing the air, oxygen and ozone with the stream of water, and discharging the mixture of the air, oxygen, ozone and water, a pressure vessel for receiving the mixture of the air, oxygen, ozone and stream of water under superatmospheric pressure, a first separation chamber in the pressure vessel for receiving and storing the mixture of air, oxygen, ozone, and stream of water, the first separation chamber having a sump therein for collecting and discharging particles found in the mixture of air, oxygen, ozone, and water, the first separation chamber having a first weir, the first weir having a top edge and a bottom edge, a second separation chamber in the pressure vessel located adjacent to the first separation chamber and the first weir, the mixture of air, oxygen, ozone, and water entering the second separation chamber from the first chamber by flowing over the first weir, the second separation chamber having a second weir spaced apart from the first weir, the second weir having a top edge and a bottom, the top edge of the second weir being lower than the top edge of the first weir, a storage chamber in the pressure vessel located adjacent to the second separation chamber and the second weir for storing the mixture of air, oxygen, ozone, and water, the storage chamber having a discharge pipe connected thereto for discharging the mixture of air, oxygen, ozone, and water, and a liquid level and pressure control means for controlling the level of the mixture of air, oxygen, ozone, and water in the pressure vessel and for controlling the pressure in the vessel.

BRIEF DESCRIPTION OF THE SEVERAL VIEWS OF THE DRAWINGS

FIG. 1 is a schematic view of the invention;

FIG. 2 is a cross-sectional view taken along lines 2—2 of FIG. 1; and

DETAILED DESCRIPTION OF THE INVENTION

Figure 3:
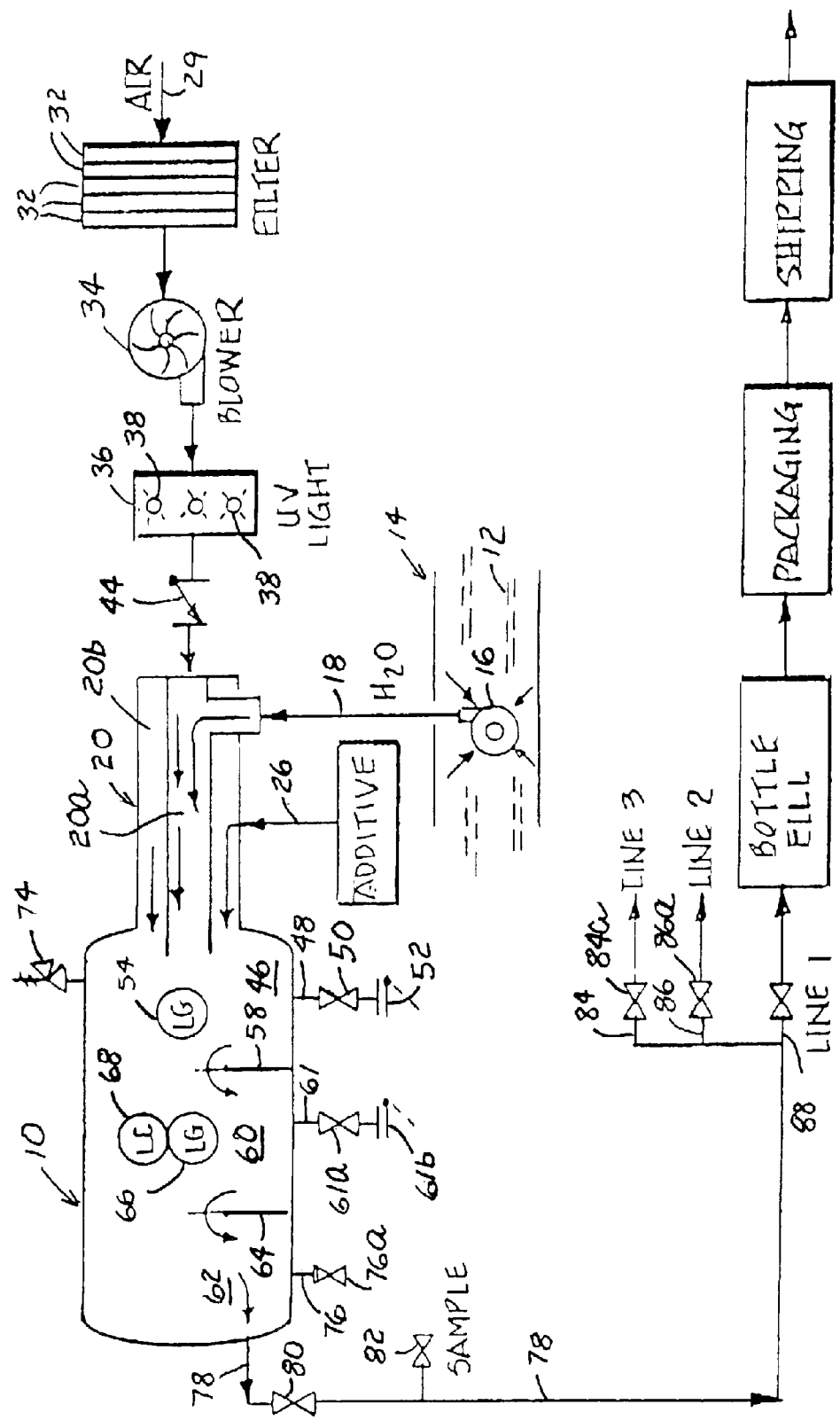
FIG. 3 is a schematic flow diagram of the invention.

Referring now to the drawing FIGS. 1–3, the apparatus of the invention can be seen to include an enclosed generally cylindrical pressure vessel under superatmospheric pressure generally indicated by the numeral 10 into which water generally indicated by the numeral 12 from a water source generally indicated by the numeral 14 is pumped. Vessel 10 is maintained under superatmospheric pressure to keep oxygen and ozone dissolved in the water 23 in the vessel 10 from being released from water 23.

Water source 14 is preferably a shallow aquifer adjacent to a natural spring located in the area where the water 12 will be bottled and close to the municipality or area in which the bottled water will be distributed and sold. However, in the absence of a natural spring, any aquifer approved by the board of health of the state in which the aquifer is located may be utilized.

If water source 14 is an artesian well or other flowing water source, water source 14 may be fed to well casing 18. However, if water source 14 is not flowing or under pressure, a pump 16 located preferably set in a screen for removing sediment(not shown) in the bore of well casing 18 pumps water 12 from the water source 14 to the surface as indicated by the arrows in well casing 18. Water 12 from casing 18 flows into cylindrical chamber 20a of a generally cylindrical multi-chambered atomizer generally indicated by the numeral 20. Cylindrical chamber 20a has an end plate 22 connected to the downstream end thereof perpendicular to the longitudinal axis of cylindrical chamber 20a. End plate 22 has a plurality of openings 22a therein. Openings 22a spray water exiting cylindrical chamber 20a into vessel 10 as shown and onto the V-shaped baffle generally indicated by the numeral 24 as shown by the arrows to aid in dissolving air and oxygen in the water sprayed from end plate 22 to further raise the oxygen content of the super-oxygenated water generally indicated by the numeral 23 stored in vessel 10.

Cylindrical chamber 20b surrounds cylindrical chamber 20a as shown in FIGS. 1 and 2. Cylindrical chamber 20b preferably has a pipe 26 communicating therewith having valve 28 therein for adding additional amounts of oxygen from an oxygen tank or reservoir(not shown) commonly available in the oxygen industry, if desired, to the water sprayed from end plate 22, or for introduction of any other desired additives to be dissolved in super-oxygenated water 23.

Atmospheric air indicated by the arrows 29 from the hollow cylindrical blower chamber assembly generally indicated by the numeral 30 is forced into chamber 20a to not dissolve in the water being pumped therethrough. Atmospheric air 29 is drawn through multiple air filters 32—32 by a conventional electric blower or fan generally indicated by the numeral 34. Filters 32—32 may be electrostatic, germicidal or other types of common filters well known in the art. Preferably, blower or fan 34 is a squirrel cage type blower. Air exhausted from fan 34 passes through an ultra violet light chamber 36 having ultraviolet lights 38 which purify and sterilize the atmospheric air 29 and generates ozone and oxygen and into adjustable venturi 40 and with accelerated force into funnel shaped chamber 42 having check valve 44 in downstream thereof. Check valve 44 is normally open when water is flowing through chamber 20a as indicated by the arrows in chamber 20a.

Thus, filtered and cleansed atmospheric air, oxygen, and ozone is mixed with water 12 in chamber 20a and flows into pressure vessel 10, where it is diffused by baffle 24 upon entering the first stage separation chamber 46. Baffle 24 causes the mixture of air, oxygen, ozone, and water to fall into first stage separation chamber 46. Any fine particles in the water 23 in first stage separation chamber 46 settle into sump 48. Fine particles which have accumulated in sump 48 can be removed by closing normally open gate valve 50 and opening hinged flange 52. A sight glass 54 enables viewing the level of water 23 in first stage separation chamber 46.

First stage separation chamber 46 is separated from second stage separation chamber 56 by weir 58, and second stage separation chamber 60 is separated from third stage separation chamber 62 by weir 64. Fine particles which have accumulated in sump 61 can be removed by closing normally open gate valve 61a and opening hinged flange 61b. A sight glass 66 enables viewing the level of water 23 in second stage separation chamber 60.

When water 23 fills first stage separation chamber 46 up to the top of weir 58, water 23 spills over the top of weir 58 into second stage separation chamber 60 until water fills up second stage separation chamber 60. A liquid level and pressure controller 68 is electrically connected by line 70 to blower 34 and ultra violet lights 38 by line 72 to pump 16 to maintain the water level and pressure in vessel 10 at a desired level to maintain added oxygen in the super-oxygenated water 23. Pressure is preferably maintained at approximately 40 psi in pressure vessel 10. A pressure relief valve 74 is connected to the top of pressure vessel 10 provided for safety.

The top of weir 64 is lower than the top of weir 58 and water 23 spills over weir 64 into storage tank stage 62. All fine particles have settled into first stage separation chambers 46 and 60. A drain line 76 with valve 76a is located in the bottom of storage tank stage 62 to drain storage tank stage 62 as desired.

A bottle filling pipe 78 is connected to the end of pressure vessel 10 slightly above the bottom of pressure vessel 10 for filling bottles with super-oxygenated water 23. Pipe 78 has a main valve 80 and a valve 82 for removing test samples of super-oxygenated water 23. Pipe 78 provides super-oxygenated water to multiple bottle filling pipes 84, 86, and 88 having valves 84a, 86a, and 88a at the ends thereof.

Pipe 88 has a plurality of valves 88b and 88c for filling bottles 90—90 on a conveyer belt 92. Conveyor belt 92 conveys filled water bottles 90—90 to a second conveyor belt 94 where then the bottles 90—90 are placed in containers 96 which are then loaded onto a truck generally indicated by the numeral 98. Preferably bottles 90—90 are constructed from a material through which oxygen and ozone in super-oxygenated water 23 are contained in the water and do not migrate through the material forming the walls and cap of the bottle 90.

Although the preferred embodiments of the invention have been described in detail above, it should be understood that the invention is in no sense limited thereby, and its scope is to be determined by that of the following claims:

What is claimed is:

1. A method for producing super-oxygenated water for human consumption comprising, sequentially:
   a. forcing atmospheric air through a filter to remove impurities,
   b. exposing said filtered air to ultra violet light to cleanse the air, and to create ozone and oxygen in said filtered air,
   c. forcing said filtered air, ozone, and oxygen into a stream of flowing water to dissolve said air, ozone, and oxygen in said water,
   d. spraying said stream of water having said air, ozone, and oxygen dissolved therein into a vessel under super-atmospheric pressure, and
   e. removing said water from said vessel and placing said water in a bottle.

2. The method of claim 1 wherein said stream of flowing water is pumped from an aquifer.

3. The method of claim 1 wherein oxygen from an oxygen reservoir is forced into contact with said spraying stream of flowing water.

4. The method of claim 2 wherein said vessel is located immediately above said aquifer.

5. The method of claim 1 wherein said vessel is located close to the area in which said water in said vessel under superatmospheric pressure will be distributed and sold.

6. An apparatus for producing super-oxygenated water for human consumption comprising:
   a. a hollow blower chamber assembly having
      i. an air blower,
      ii. filter for filtering atmospheric air entering said air blower,
      iii. an ultra violet light chamber for receiving said filtered air discharged from said air blower having ultra violet lights which shine on said air pumped from said air blower to form oxygen and ozone in said air and discharging said air, oxygen and ozone therefrom,
   b. a first cylindrical chamber for receiving a stream of flowing water and for receiving said air, oxygen, and ozone discharged from said ultra violet light chamber, mixing said air, oxygen and ozone with said stream of water, and discharging said mixture of said air, oxygen, ozone and water,
   c. a pressure vessel for receiving said mixture of said air, oxygen, ozone and stream of water under superatmospheric pressure,
   d. a first separation chamber in said pressure vessel for receiving and storing said mixture of air, oxygen, ozone, and stream of water, said first separation chamber having a sump therein for collecting and discharging particles found in said mixture of air, oxygen, ozone, and water, said first separation chamber having a first weir, said first weir having a top edge and a bottom edge, e. a second separation chamber in said pressure vessel located adjacent to said first separation chamber and said first weir, said mixture of air, oxygen, ozone, and water entering said second separation chamber from said first chamber by flowing over said first weir, said second separation chamber having a second weir spaced apart from said first weir, said second weir having a top edge and a bottom, said top edge of said second weir being lower than the top edge of said first weir, f. a storage chamber in said pressure vessel located adjacent to said second separation chamber and said second weir for storing said mixture of air, oxygen, ozone, and water, said storage chamber having a discharge pipe connected thereto for discharging said mixture of air, oxygen, ozone, and water, and g. a liquid level and pressure control means for controlling the level of said mixture of air, oxygen, ozone, and water in said pressure vessel and for controlling the pressure in said vessel.

7. The apparatus of claim 6 wherein said pressure vessel has a baffle positioned in said pressure vessel to contact said mixture of air, oxygen, ozone, and water being discharged into said pressure vessel to diffuse said mixture and cause said mixture to fall into said first separation chamber.

8. The apparatus of claim 6 wherein said second separation chamber has a sump therein for collecting and discharging particles found in said mixture of air, oxygen, ozone, and water.

9. The apparatus of claim 6 wherein a second cylindrical chamber surrounds said first cylindrical chamber, said second cylindrical chamber having a pipe communicating therewith having a valve therein for adding additional amounts of an additive to said mixture of air, oxygen, ozone, and water.

10. The apparatus of claim 9 wherein said additive is oxygen.

11. The apparatus of claim 6 wherein said pressure vessel has a sight gauge for viewing the level of liquid in said pressure vessel.

12. The apparatus of claim 6 wherein said pressure vessel has a pressure relief valve.

13. The apparatus of claim 6 wherein said sump has a gate valve connected thereto.

14. The apparatus of claim 13 wherein a hinged flange is located beneath said gate valve for dumping fine particles from said sump.

15. The apparatus of claim 8 wherein said sump in said second separation chamber has a gate valve connected thereto.

16. The apparatus of claim 15 wherein a hinged flange is located beneath said gate valve for dumping fine particles from said sump in said second separation chamber.

\* \* \* \* \*